United States Patent
Duret et al.

(10) Patent No.: US 11,204,260 B2
(45) Date of Patent: Dec. 21, 2021

(54) SYSTEM FOR DETERMINING AT LEAST ONE ROTATION PARAMETER OF A ROTATING MEMBER

(71) Applicant: NTN-SNR ROULEMENTS, Annecy (FR)

(72) Inventors: Christophe Duret, Bluffy (FR); Cécile Flammier, Annecy (FR); Etienne Vandamme, Alleves (FR)

(73) Assignee: NTN-SNR Roulements, Annecy (FR)

( * ) Notice: Subject to any disclaimer, the term of this patent is extended or adjusted under 35 U.S.C. 154(b) by 14 days.

(21) Appl. No.: 16/816,448

(22) Filed: Mar. 12, 2020

(65) Prior Publication Data

US 2020/0292352 A1 Sep. 17, 2020

(51) Int. Cl.
*G01D 5/14* (2006.01)
*G01D 5/16* (2006.01)

(52) U.S. Cl.
CPC .............. *G01D 5/142* (2013.01); *G01D 5/16* (2013.01)

(58) Field of Classification Search
CPC ....... G01D 5/16; G01D 5/145; G01D 5/24438
See application file for complete search history.

(56) References Cited

U.S. PATENT DOCUMENTS

| | | | | |
|---|---|---|---|---|
| 6,163,147 A | * | 12/2000 | Peilloud | G01D 5/145 324/207.2 |
| 2016/0087567 A1 | * | 3/2016 | Thomas | H02P 21/06 318/767 |
| 2018/0083497 A1 | * | 3/2018 | Bernot | H02K 1/145 |

FOREIGN PATENT DOCUMENTS

| | | |
|---|---|---|
| WO | 2004083881 A1 | 9/2004 |
| WO | 2006064169 A2 | 6/2006 |
| WO | 2018051011 A1 | 3/2018 |

* cited by examiner

*Primary Examiner* — Alvaro E Fortich
(74) *Attorney, Agent, or Firm* — Murtha Cullina LLP

(57) ABSTRACT

The invention relates to a system comprising a coder that has an alternation of North and South magnetic poles separated by transitions extending along an helix of pitch p and of angle α. The invention having $N_{pp}$ pairs of North and South poles and a polar width $L_p$ measured along a normal (N) to the transitions which are: $N_{pp}=\pi a/I$ and $L_p=p.\cos\alpha$. The invention also includes a sensor able to detect the period magnetic field emitted by the coder by means of at least two sensitive magnetic elements which are disposed at a radial reading distance from the magnetic track. The sensitive elements are disposed in relation to one another to deliver signals in quadrature.

11 Claims, 4 Drawing Sheets

SYSTEM FOR DETERMINING AT LEAST ONE ROTATION PARAMETER OF A ROTATING MEMBER

CROSS-REFERENCE TO RELATED APPLICATION

This application claims the priority of French patent application No. 19 02522, filed on Mar. 12, 2019, the entire contents of which are incorporated herein by reference.

TECHNICAL FIELD

The invention relates to a system for determining at least one rotation parameter of a rotating member, the system comprising a coder emitting a periodic magnetic field as well as a sensor able to detect the magnetic field.

BACKGROUND

In many applications, it is desired to know in real-time and with optimum quality at least one rotation parameter of a rotating member, its position, its speed, its acceleration or its direction of movement.

To do this, document WO-2006/064169 proposes the use of a coder intended to be integral with the mobile member and whereon a magnetic track is formed which is able to emit a pseudo-sinusoidal magnetic field at a reading distance from a sensor comprising several sensitive elements.

Advantageously, each sensitive element can comprise at least one pattern with a Tunnel Magneto Resistance (TMR) material base of which the resistance varies according to the magnetic field detected, as described for example in document WO-2004/083881.

To determine a movement parameter of the mobile member according to the change in the magnetic field detected, document WO-2006/064169 provides a combination of the signals representing the resistance of each one of the sensitive elements to deliver two signals in quadrature and of the same amplitude which can be used to calculate the parameter.

Document WO-2018/051011 proposes a system for determining in which the track of the coder has an alternation of North and South magnetic poles separated by transitions with each one extending along an Archimedean spiral. In relation with an axial reading of the magnetic field delivered by the coder, this embodiment makes it possible to dissociate the number of magnetic poles, the width of the latter and the diameter of the coder. It is thus possible to have few poles while still having magnetic signals with good sinusoidality.

Moreover, some applications require a radial reading of the magnetic field delivered by the coder, due to constraints concerning the space available. To do this, coders are known comprising a body that has a cylindrical periphery on which the magnetic track is formed, the track having magnetic transitions aligned with the axis of rotation.

In this embodiment, the width of the poles is the ratio of the circumference to the number of poles, which gives rise to a problem with coders with a low number of pairs of poles, typically less than 6, since the polar width becomes substantial, about ten millimetres.

These wide poles deliver a magnetic signal of which the sinusoidality is poor with a low read gap, becoming rich in odd harmonics, improper for precise angle measurement, requiring moving away from sensitive elements of the magnetic track, which goes against the amplitude of the signal and therefore good detection thereof by the sensitive elements.

In addition, wide poles require a thickness of the coder which is also more substantial to preserve a sinusoidality and an amplitude that are sufficient for the magnetic signal. This is not favourable to the integration of the coder in small areas and complicates the method of magnetisation, because a greater thickness of material has to be saturated magnetically.

The invention aims to perfect prior art by proposing a system for determining with radial reading of the magnetic field delivered by a coder, wherein the compromise between the periodicity and the amplitude of the magnetic field detected can be satisfied without inducing any specific size constraints for the coder-in relation with a magnetic coder with a low number of pairs of poles.

The coder with radial reading according to the invention is such that the polar width of each one of the poles is independent of the number of pairs of poles, thus being able to reconcile a low number of pairs of poles with an adequate positioning of the sensitive elements relatively to the sinusoidality and to the amplitude of the magnetic field to be detected.

To this effect, the invention proposes a system for determining at least one rotation parameter of a rotating member, the system comprising:

a coder intended to be associated rotationally with the rotating member in such a way as to move jointly with it, the coder comprising a body having a cylindrical periphery with a radius around an axis of revolution, the periphery having an alternation of North and South magnetic poles of width l which are separated by transitions, each one of the transitions extending along an helix of pitch p and of angle $\alpha$ to form a multipolar magnetic track which is able to emit a periodic magnetic field representing the rotation of the coder, the track having $N_{pp}$ pairs of North and South poles and a polar width $L_p$ measured along a normal to the transitions which are: $N_{pp}=\pi a/l$ and $L_p=p.\cos\alpha$;

a sensor able to detect the period magnetic field emitted by the coder by means of at least two sensitive magnetic elements which are disposed at a radial reading distance from the magnetic track, the sensitive elements being disposed in relation to one another to deliver signals in quadrature.

BRIEF DESCRIPTION OF THE DRAWINGS

Other particularities and advantages of the invention shall appear in the following description, made in reference to the accompanying figures, wherein:

FIG. 5a.

DETAILED DESCRIPTION

Figure 1A:
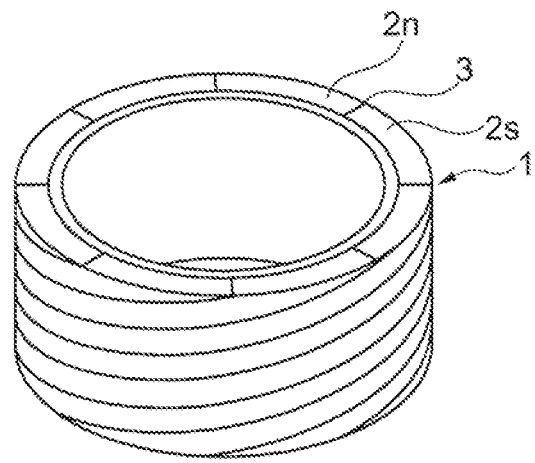
FIG. 1a and FIG. 1b diagrammatically show a coder of a system for determining according to the invention, respectively in perspective (FIG. 1a) and as a side view (FIG. 1b)

In relation with these figures, a system for determining at least one rotation parameter of a rotating member with respect to a fixed structure is described. In particular, the parameter of the rotating member can be selected from its position, its speed, its direction of rotation, its acceleration or its direction of movement axially.

In one embodiment, the system can be used in relation with the controlling of a brushless direct current electric motor, making it possible to know the absolute angular position on a pair of motor poles of the rotor with respect to the stator.

The system for determining comprises a coder 1 intended to be integral with the rotating member in such a way as to move jointly with it, the coder comprising a body having a cylindrical periphery with a radius around an axis of revolution X on which is formed a magnetic track 2 which is able to emit a periodic magnetic field representative of the rotation of the coder. The magnetic field emitted can be sinusoidal or pseudo-sinusoidal, i.e. having at least one portion which can be correctly approximated by a sinusoid.

The track 2 has an alternation of North 2n and South 2s magnetic poles of width l which are separated by transitions 3, each one of the transitions extending along a helix of pitch p and of angle α.

Thus, the magnetic track has $N_{pp}$ pairs of North and South poles and a polar width $L_p$ measured along a normal N to the transitions 3 which are: $N_{pp}=\pi a/l$ and $L_p=p.\cos\alpha$. The magnetic track 2 delivers a pseudo-sinusoidal magnetic signal of which the spatial period along the normal N is equal to $\lambda=2.L_p$.

The magnetic field generated by the coder 1 on a pair of magnetic poles 2n, 2s is the combination of a perfect fundamental sinusoidal component that is sought to be measured in order to determine the parameter, and of several odd-order harmonics (3, 5, etc.).

If it is assumed that the coder 1 rotates at a constant speed of rotation ω, the magnetic field can be written in the following way:

$$H(t)=H_1.\sin\omega t+H_3.\sin 3\omega t+H_5.\sin 5\omega t+\ldots$$

The amplitude $H_3$ of the $3^{rd}$ order harmonic can typically represent 5% of the amplitude $H_1$ of the fundamental. According to the position of the sensor and the reading distance, this proportion of the amplitude $H_3$ of the $3^{rd}$ order harmonic can be much higher.

Figure 1B:
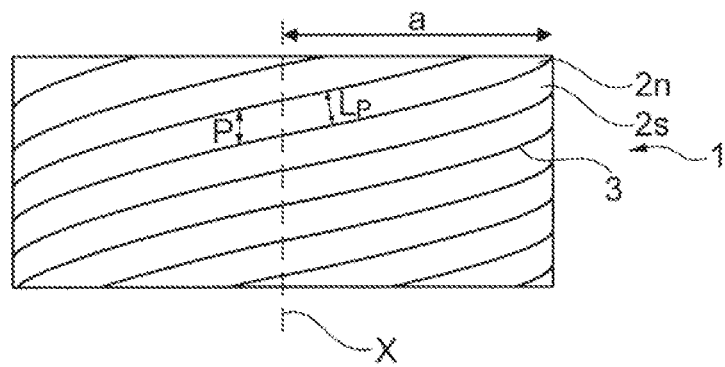
Figure 2:
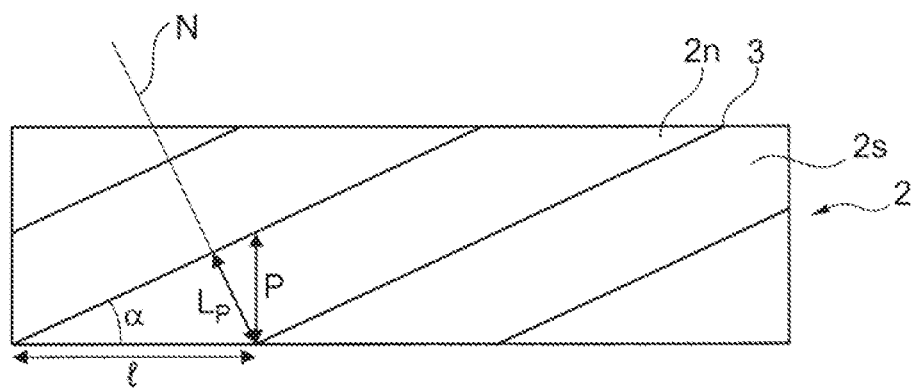
FIG. 2 is a flat representation of the cylindrical periphery of the coder of FIGS. 1a and 1b.

The helical geometry of the magnetic track 2 makes it possible the number $N_{pp}$ of pairs of poles 2n, 2s as well as the polar width $L_p$ to be chosen independently of the radius a of the magnetic track 2. In relation with FIGS. 1a and 1b, the coder 1 comprises four pairs of poles 2n, 2s, which is particularly suitable for the controlling of an electric motor with four pairs of poles, the system providing the absolute position on a pair of motor poles, i.e. 90° mechanical.

According to an embodiment, the coder 1 is formed from a magnet on the cylindrical periphery of which the multipolar magnetic track 2 is carried out. The magnet can be formed from an annular matrix, for example made from a base of a plastic or elastomer material, in which magnetic particles are dispersed, including particles of ferrite or of rare earths NdFeB.

The system for determining comprises a sensor that is intended to be integral with the fixed structure, the sensor being able to detect the periodic magnetic field emitted by the coder 1. To do this, the sensor comprises at least two sensitive magnetic elements 4, 5 which are disposed at a radial reading distance from the magnetic track 2 in order to each deliver a signal representing the rotation of the coder 1, the sensitive elements being disposed in relation to one another to deliver signals in quadrature.

Each one of the sensitive elements 4, 5 can be chosen from magnetically sensitive probes. For example, Hall, tunnel magneto resistance (TMR), anisotropic magneto resistance (AMR) or giant magneto resistance (GMR) probes can measure each one of the two components of the magnetic field (normal and tangential to the coder 1).

As described in document WO-2004/083881, each element 4, 5 forms a tunnel junction by comprising a stack of a reference magnetic layer, of an insulating separation layer and of a magnetic layer that is sensitive to the field to be detected, the resistance of the stack being according to the relative orientation of the magnetisation of the magnetic layers.

Advantageously, each sensitive element 4, 5 can comprise at least one pattern with a magneto resistance material base, with a tunnel effect, of which the resistance varies according to the magnetic field, a sensitive element 4, 5 being able to comprise a single motif or a group of motifs connected in series or in parallel.

Alternatively, the normal component only of the magnetic field delivered by the coder 1 can be measured, for example using Hall elements. Using the normal field alone is favourable because it is more sinusoidal than the tangential field.

In order to be able to determine the rotation parameter of the rotating member, the signals delivered by the sensitive elements 4, 5 must preferably be in quadrature, i.e. geometrically offset by 90° divided by $N_{pp}$. By using such signals in quadrature, in the sensor or in an associated calculator, it is known to determine the angular position of the coder 1, for example through a direct calculation of an arctangent function, using a Look-Up Table (LUT) or a method of the CORDIC type.

Figure 3A:
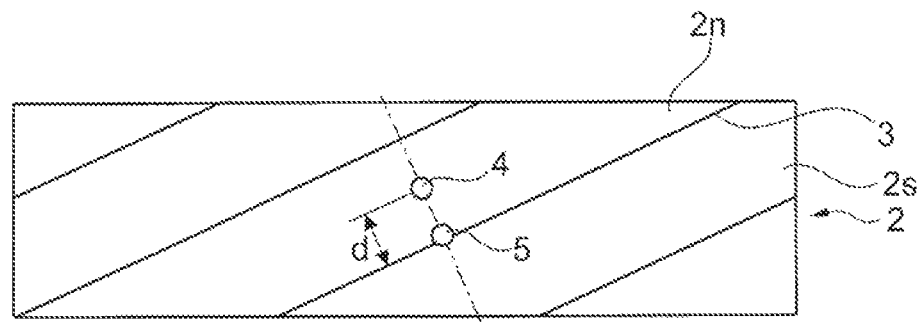
FIG. 3a and FIG. 3b diagrammatically show respectively an alternative embodiment of the arrangement at a radial reading distance of the sensitive elements with respect to a coder according to the invention.
Figure 3B:
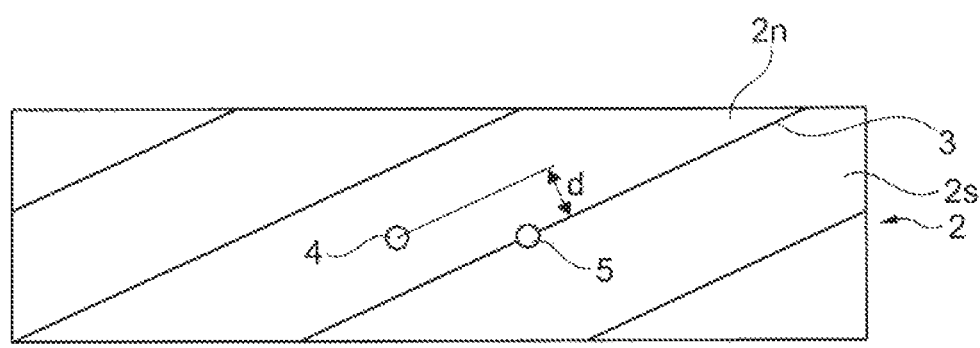

To do this, in relation with FIGS. 3a and 3b, the sensor comprises at least two sensitive elements 4, 5 which are spaced by a distance d measured along the normal N to the transitions 3 which is equal to $L_p/2$ modulo $L_p$. In other terms, when a sensitive element 4 is positioned facing a transition 3, the other sensitive element 5 is positioned on a helix parallel to the transition and spaced from it by a distance d measured along the normal N.

Thus, a good compromise is obtained between sinusoidality and amplitude of the detected signal. This optimum positioning can be obtained with a polar width $L_p$ comprised between 2 and 6 mm, and then even with a number $N_{pp}$ of pairs of poles 2n, 2s of the coder 1 which is less than 6.

In relation with an application of the system in controlling an electric motor, the good sinusoidality of the signal delivered to the control calculator allows for:

better performance, at start-up, for example the time for reaching the speed or position setting;

a more "gentle" operation, without torque shifts in steady state;

less energy consumption;

a lower operating temperature;

a more substantial maximum torque.

FIG. 3a shows two sensitive elements 4, 5 which are aligned along the normal N to the transitions 3, the elements being aligned circumferentially in FIG. 3b, in the median position of the periphery of the coder 1 in order to be separated as much as possible from the edges of the coder. Alternatively, the two sensitive elements 4, 5 can be aligned along the axis of revolution X.

In relation with FIGS. 4a to 5c, the sensor comprises at least two groups of two sensitive elements $4_1, 4_2; 5_1, 5_2$, with the barycentre of the sensitive elements $4_1, 4_2; 5_1, 5_2$ of one group being separated from the barycentre of the sensitive elements $4_1, 4_2; 5_1, 5_2$ of the other group by a distance d measured along the normal N to the transitions 3 which is equal to $L_p/2$ modulo $L_p$.

Thus, in relation with such a duplication of the sensitive elements 4, 5 of the embodiment of FIGS. 3a and 3b, the two groups allow for a filtering of the noise coming from the outside (for example from the motor or neighbouring interconnections).

Indeed, by providing that the sensor further comprise a device for subtracting signals ($V_1, V_2$) delivered by the two sensitive elements $4_1, 4_2; 5_1, 5_2$ of each one of the groups, if the magnetic field includes an identical noise component on the different sensitive elements $4_1, 4_2; 5_1, 5_2$, the latter will be subtracted from the output signal.

By positioning the sensitive elements $4_1, 4_2; 5_1, 5_2$ of a group at the magnetic phases respectively $\varphi_1$ and $\varphi_2$, i.e. by spacing them by a distance e measured along the normal N to the transitions 3 which is such that $$\varphi_1 - \varphi_2 = \frac{e}{2L_p} * 360,$$

the signals $V_1, V_2$ delivered by each one of the sensitive elements $4_1, 4_2; 5_1, 5_2$ can be written:

$V_1(t)=G.H_1.\sin(\omega t+\varphi_1)+G.H_3.\sin(3\omega t+3\varphi_1)+G.H_5.\sin(5\omega t+5\varphi_1)+\ldots$ $V_2(t)=G.H_1.\sin(\omega t+\varphi_2)+G.H_3.\sin(3\omega t+3\varphi_2)+G.H_5.\sin(5\omega t+5\varphi_2)+\ldots$ G being the supposedly identical gain of the sensitive elements $4_1, 4_2; 5_1, 5_2$, $\omega$ being the speed of rotation, $H_1$ being the amplitude of the fundamental for i=1 and of the i-th order harmonics for i=3, 5, etc.

A subtractor circuit calculates the difference which is then written:

$$V_1(t) - V_2(t) = G \cdot H_1 \cdot [\sin(\omega t + \varphi_1) - \sin(\omega t + \varphi_2)] +$$
$$G \cdot H_3 \cdot [\sin(3\omega t + 3\varphi_1) - \sin(3\omega t + 3\varphi_2)] +$$
$$G \cdot H_5 \cdot [\sin(5\omega t + 5\varphi_1) - \sin(5\omega t + 5\varphi_2)] + \ldots =$$
$$2 \cdot G \cdot H_1 \cdot \sin\left(\frac{\varphi_1 - \varphi_2}{2}\right) \cdot \cos\left(\omega t + \frac{\varphi_1 + \varphi_2}{2}\right) +$$
$$2 \cdot G \cdot H_3 \cdot \sin\left(3 \cdot \frac{\varphi_1 - \varphi_2}{2}\right) \cdot \cos\left(3\omega t + 3 \cdot \frac{\varphi_1 + \varphi_2}{2}\right) +$$
$$2 \cdot G \cdot H_5 \cdot \sin\left(5 \cdot \frac{\varphi_1 - \varphi_2}{2}\right) \cdot \cos\left(5\omega t + 5 \cdot \frac{\varphi_1 + \varphi_2}{2}\right) + \ldots$$

Figure 4A:
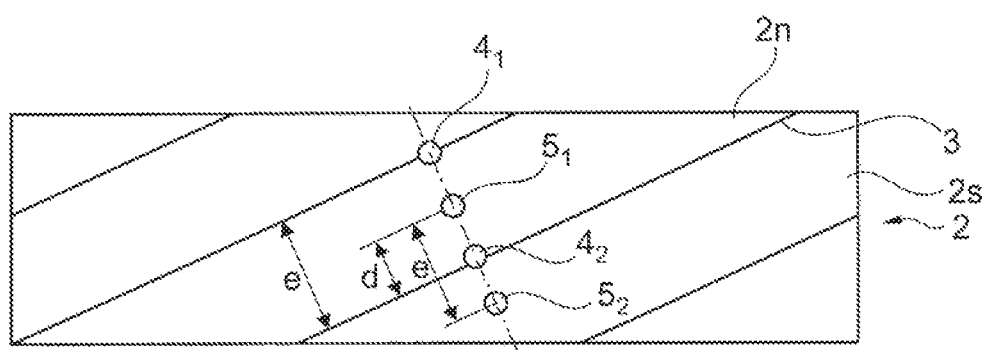
FIG. 4a and FIG. 4b diagrammatically show respectively an alternative embodiment of the arrangement at a radial reading distance of the sensitive elements by group with respect to a coder according to the invention.
Figure 4B:
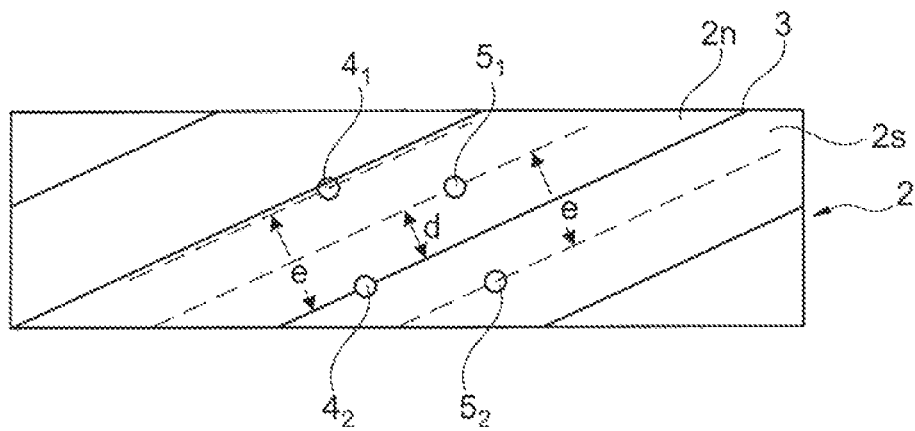

In relation with FIGS. 4a and 4b, $e=L_p$ modulo $2L_p$, i.e. the sensitive elements $4_1, 4_2; 5_1, 5_2$ of a group are offset 180° modulo 360°, this difference is written:

$$V_1(t) - V_2(t) = 2 \cdot G \cdot H_1 \cos\left(\omega t + \frac{\varphi_1 + \varphi_2}{2}\right) -$$
$$2 \cdot G \cdot H_3 \cdot \cos\left(3\omega t + 3 \cdot \frac{\varphi_1 + \varphi_2}{2}\right) + 2 \cdot G \cdot H_5 \cdot \cos\left(5\omega t + 5 \cdot \frac{\varphi_1 + \varphi_2}{2}\right) + \ldots$$

It can be seen that the $3^{rd}$ and $5^{th}$ order harmonics are retained and have the same gain 2 as the fundamental after the subtraction operation.

In order to obtain a precise determination of the rotation parameter, it is sought to measure the filtered signal of at least the $3^{rd}$ order harmonic. However, any fixed compensation of the error generated by the harmonics is difficult to carry out, in that it depends on the measurement conditions (gap, position of the sensor). Moreover, a calibration is also difficult to consider for large volume and low cost application.

Figure 6:
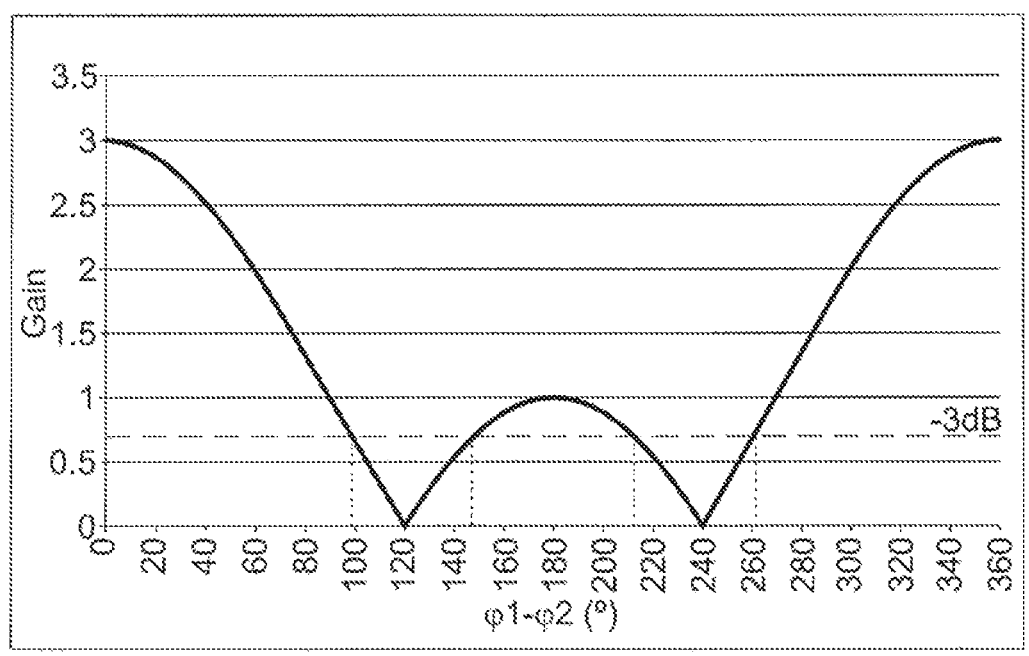
FIG. 6 is a curve showing the filtering of the $3^{rd}$ order harmonic according to the distance between the sensitive elements of a group.

FIG. 6 shows the filtering of the $3^{rd}$ order harmonic according to the value of the offset $\varphi_1-\varphi_2$.

Figure 5A:
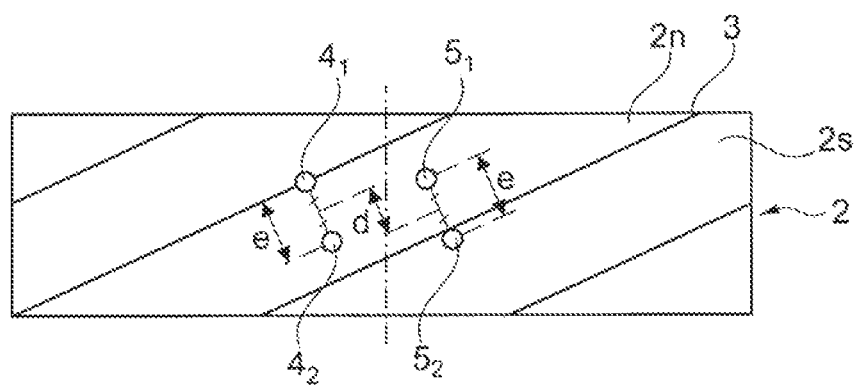
Figure 5B:
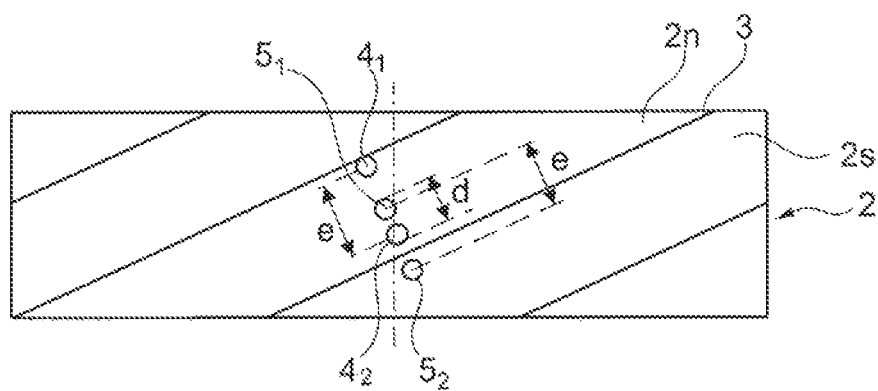
FIG. 5b and FIG. 5c diagrammatically show respectively an alternative embodiment of the arrangement at a radial reading distance of the sensitive elements by group with respect to a coder according to the invention.
Figure 5C:
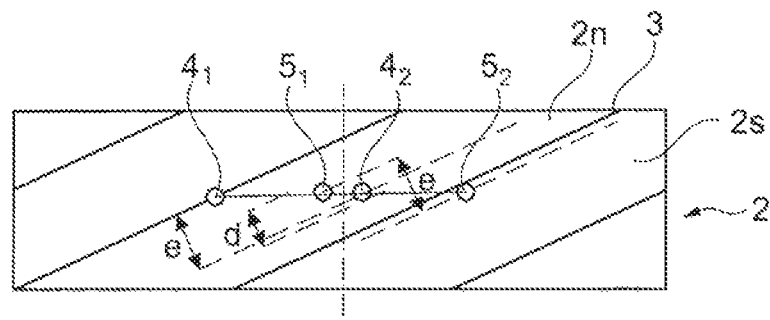

In relation with FIGS. 5a to 5c in which the distance e is substantially equal to $2/3L_p$ or $4/3L_p$ modulo $2L_p$, the difference is written:

$$V_1(t) - V_2(t) = \sqrt{3} \cdot G \cdot H_1 \cos\left(\omega t + \frac{\varphi_1 + \varphi_2}{2}\right) +$$
$$0 - \sqrt{3} \cdot G \cdot H_5 \cdot \cos\left(5\omega t + 5 \cdot \frac{\varphi_1 + \varphi_2}{2}\right) + \ldots$$

In this case, the $3^{rd}$ order harmonic is cancelled, the fundament and the $5^{th}$ order harmonic have a gain of 1.73 after the subtraction operation. A $3^{rd}$ order harmonic spatial filter was then carried out, while still retaining 86.5% of the fundamental.

Generally and in relation with FIG. 6, considering that the filter of the $3^{rd}$ order harmonic plays its role if it removes at least 3 dB from its value without filtering in relation to the amplitude of the fundamental, it is therefore required that:

$$\left|\frac{2 \cdot G \cdot H_3 \cdot \sin\left(3\frac{\varphi_1 - \varphi_2}{2}\right)}{2 \cdot G \cdot H_1 \cdot \sin\left(\frac{\varphi_1 - \varphi_2}{2}\right)}\right| \leq \frac{\sqrt{2}}{2} \cdot \left|\frac{H_3}{H_1}\right|$$

$$\Leftrightarrow \left|\frac{\sin\left(3\frac{\varphi_1 - \varphi_2}{2}\right)}{\sin\left(\frac{\varphi_1 - \varphi_2}{2}\right)}\right| \leq \frac{\sqrt{2}}{2}$$

$$\Leftrightarrow \varphi_1 - \varphi_2 \in [99°; 148°] \; modulo \; 360°$$

$$or \; \varphi_1 - \varphi_2 \in [212°; 261°] \; modulo \; 360°$$

Expressed in distance, in order to obtain a filtering of the $3^{rd}$ order harmonic, it is therefore required that the sensitive elements $4_1, 4_2; 5_1, 5_2$ of a group are spaced by a distance e measured along the normal N to the transitions 3 which is such that:

$0.55L_p<e<0.82L_p$, modulo $2L_p$; or $1.18L_p<e<1.45L_p$, modulo $2L_p$.

The distance e between the sensitive elements $4_1, 4_2; 5_1, 5_2$ of a group can vary within the ranges mentioned hereinabove in order to optimise the couple filtering—gain. Moreover, according to the space available, the sensitive elements $4_1, 4_2; 5_1, 5_2$ of the groups can be aligned along the normal N to the transitions 3 (FIGS. 4a and 5b) or circumferentially (FIG. 5c). Alternatively, the sensitive elements $4_1, 4_2; 5_1, 5_2$ of a group can be offset circumferentially with respect to those of the other group (FIGS. 4*b* and 5*a*).

The suppression, or at least the attenuation, of the $3^{rd}$ order harmonic in the processed signals to determine the rotation parameter is beneficial relative to the precision of the determination, but also for the processing algorithms of the signal that carry out:

deletion of the offset of the signals;
balancing of the amplitudes of the signals;
phase correction between the signals.

What is claimed is:

1. A system for determining at least one rotation parameter of a rotating member, the system comprising:
a coder intended to be associated rotationally with the rotating member in such a way as to move jointly with it, the coder comprising a body having a cylindrical periphery with a radius (a) around an axis of revolution (X), the periphery having an alternation of North and South magnetic poles of width 1 which are separated by transitions, each one of the transitions extending along an helix of pitch p and of angle □ to form a multipolar magnetic track which is able to emit a periodic magnetic field representative of the rotation of the coder, the track having $N_{pp}$ pairs of North and South poles and a polar width $L_p$ measured along a normal (N) to the transitions which are: $N_{pp}=\pi a/l$ and $L_p=p.\cos \alpha$;
a sensor able to detect the period magnetic field emitted by the coder by means of at least two sensitive magnetic elements which are disposed at a radial reading distance from the magnetic track, the at least two sensitive magnetic elements being disposed in relation to one another to deliver signals in quadrature.

2. The system according to claim 1, wherein the sensor comprises at least two sensitive elements which are spaced by a distance d measured along the normal (N) to the transitions which is equal to $L_p/2$ modulo $L_p$.

3. The system according to claim 2, wherein the at least two sensitive magnetic elements are aligned circumferentially.

4. The system according to claim 2, wherein the at least two sensitive magnetic elements are aligned along the normal (N) to the transitions.

5. The system according to claim 2, wherein the at least two sensitive magnetic elements are aligned along the axis of revolution (X).

6. The system according to claim 1, wherein the sensor comprises at least two groups of two sensitive elements, with the barycentre of the sensitive elements of one group being separated from the barycentre of the sensitive elements of the other group by a distance d measured along the normal (N) to the transitions which is equal to $L_p/2$ modulo $L_p$.

7. The system according to claim 6, wherein the sensor further comprises a device for subtracting signals ($V_1$, $V_2$) delivered by the two sensitive elements of each one of the groups.

8. The system according to claim 6, wherein the sensitive elements of one group are spaced by a distance e measured along the normal (N) to the transitions which: $e=L_p$ modulo $2L_p$.

9. The system according to claim 6, wherein the sensitive elements of a one group are spaced by a distance e measured along the normal (N) to the transitions which:
$0.55L_p<e<0.82L_p$, modulo $2L_p$; or
$1.18L_p<e<1.45L_p$, modulo $2L_p$.

10. The system according to claim 9, wherein the distance e is equal to $2/3L_p$ or $4/3L_p$ modulo $2L_p$.

11. The system according to claim 6, wherein the sensitive elements of one group are aligned.

* * * * *